United States Patent Office 3,087,957
Patented Apr. 30, 1963

3,087,957
O-ALKYNYL O-ALKYL PHOSPHORAMIDATES AND PHOSPHORAMIDOTHIOATES
Herman O. Senkbeil, Midland, Mich., assignor to The Dow Chemical Company, Midland, Mich., a corporation of Delaware
No Drawing. Filed July 6, 1961, Ser. No. 122,090
5 Claims. (Cl. 260—461)

The present invention is directed to phosphoramidates and phosphoramidothioates corresponding to the formula

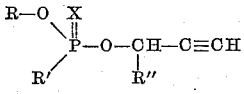

In this and succeeding formulae, R represents lower alkyl, R' represents amino or lower alkyl amino, R" represents hydrogen, methyl or chloromethyl and X represents sulfur or oxygen. In the present specification and claims, the expression "lower alkyl" is employed to refer to radicals containing from 1 to 5 carbon atoms, inclusive. These compounds are liquid materials which are somewhat soluble in many common organic solvents and of low solubility in water. The compounds are useful as herbicides and parasiticides and are adapted to be employed as active toxic constituents in compositions for the control of many plants, mites, insects and bacterial and fungal organisms such as ascarids, trichostrongylids, ticks, daphnia, aphids, worms, flies, beetles, *Alternaria solani*, roaches, pigweeds and millet.

The novel compounds of the present invention are prepared by reacting an O-alkynyl O-lower alkyl phosphorochloridate or phosphorochloridothioate corresponding to the formula

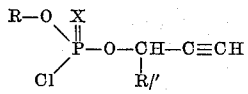

with ammonia or a lower alkyl amine having the formula R'H. The reaction conveniently is carried out in an inert organic liquid such as benzene, toluene, carbon tetrachloride and methylene chloride. The amounts of the reagents to be employed are not critical, some of the desired product being obtained when employing any amounts of the reagents. In the preferred method of operation, good results are obtained when employing one molecular proportion of the O-alkynyl O-lower alkyl phosphorochloridate or phosphorochloridothioate with at least two molecular proportions of ammonia or amine. The reaction takes place smoothly at the temperature range of from −20° to 25° C. with the production of the desired product and chloride of reaction. This chloride appears in the reaction mixture as hydrogen chloride salt of the ammonia or alkyl amine reactant.

In carrying out the reaction, the reactants are contacted and mixed together in any convenient manner and the resulting mixture maintained for a period of time in the reaction temperature range to insure completion of the reaction. Following the reaction, the reaction mixture is filtered and low boiling constituents removed from the filtrate by distillation under reduced pressure to obtain the desired product as a residue. This product may be further purified by conventional methods such as washing with water and extraction with organic solvents.

In an alternative method, the new compounds are prepared by reacting one molecular proportion of an O-alkynyl phosphoramidochloridate or phosphoramidochloridothioate corresponding to the formula

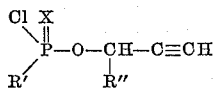

with about one or more molecular proportions of an alkali metal salt of a lower alkanol having the formula ROH. The reaction conveniently is carried out in one of the aforementioned solvents and takes place smoothly at the temperature range of from −20° to 25° C. with the production of the desired product and chloride of reaction. In carrying out the reaction, the reactants are mixed and contacted together in any convenient fashion and maintained for a short period to insure completion of the reaction. Upon completion of the reaction, the desired product is separated by conventional methods and conveniently by the procedures aforedescribed.

In a further method, certain compounds of the present invention are prepared by reacting an O-lower alkyl phosphoramidochloridate or phosphoramidochloridothioate corresponding to the formula

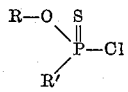

with an alkali metal salt of an alcohol corresponding to the formula $$HO-CH-C\equiv CH$$
$$\phantom{HO-C}|$$
$$\phantom{HO-CH-C\equiv C}Y$$

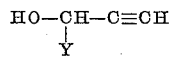

wherein Y represents hydrogen or methyl. The reaction conveniently is carried out in one of the aforementioned solvents and takes place readily at temperatures of from −20° to 25° C. with the production of the desired product and chloride of reaction. Good results are obtained when employing substantially equimolecular proportions of the alkali metal salt compound and the O-lower alkyl phosphoramidochloridate or phosphoramidochloridothioate. The chloride of reaction appears in the reaction mixture as alkali metal chloride. Upon completion of the reaction, the desired products are separated and purified in the manner as previously described.

The following examples merely illustrate the invention and are not to be construed as limiting:

*Example 1.—O-2-Propynyl O-Methyl N-Methyl Phosphoramidothioate*

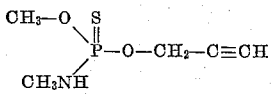

Sodium (4.6 grams; 0.2 mole) is dispersed in about 300 milliliters of benzene and 11.2 grams (0.2 mole) of propargyl alcohol subsequently added thereto to prepare a solution of the sodium salt of the propargyl alcohol. O-methyl N-methyl phosphoramidochloridothioate (37.8 grams; 0.237 mole) is added portionwise with stirring to the above-prepared salt solution. The addition is carried out over a period of about one hour and at a temperature of from 5° to 10° C. Following the addition, the reaction mixture is filtered and the filtrate concentrated by distillation under reduced pressure to obtain an O-2-propynyl O-methyl N-methyl phosphoramidothioate product as a liquid residue having a molecular weight of 179 and sulfur and phosphorus contents of 18.1 percent and 17.3 percent, respectively, as compared to theoretical contents of 17.9 percent and 17.3 percent.

*Example 2.—O-[1-(Trichloromethyl)-2-Propynyl] O-Methyl N-Methyl Phosphoramidothioate*

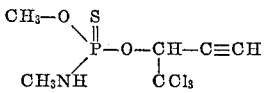

Sodium (1.25 grams; 0.05 mole) is dissolved in 75 milliliters of methanol to prepare a solution of sodium methylate. This salt solution is added portionwise with stirring to 15.05 grams (0.05 mole) of O-[1-(trichloromethyl)-2-propynyl] N-methyl phosphoramidochloridothioate (refractive index n/D of 1.5419 at 25°) dispersed in 75 milliliters of methanol. The addition is carried out at a temperature of from 5° to 15° C. and over a period of 20 minutes with stirring being continued for 3 hours at room temperature to insure completion of the reaction. The reaction mixture is then filtered and the reaction medium removed by evaporation under vacuum to obtain an O-[1-(trichloromethyl)-2-propynyl] O-methyl N-methyl phosphoramidothioate product as a liquid residue having a refractive index n/D of 1.543 at 25° C. and chlorine and sulfur contents of 33.7 percent and 10.8 percent, respectively, as compared to theoretical contents of 35.9 percent and 10.8 percent.

*Example 3.—O-2-Propynyl O-Butyl N-Dibutyl Phosphoramidothioate*

Sodium (2.3 grams; 0.1 mole) is dissolved in 5.6 grams (0.1 mole) of propargyl alcohol and 250 milliliters of benzene to prepare a solution of the sodium derivative of propargyl alcohol. O-butyl N-dibutyl phosphoramidochloridothioate (30 grams; 0.1 mole) is added portionwise with stirring to the above solution containing the sodium alcoholate. The addition is carried out at a temperature of from 5° to 6.5° C. and over a period of ½ hour with stirring being continued for an additional half hour as the reaction mixture came to room temperature. The reaction mixture is then filtered and the reaction medium removed from the filtrate by fractional distillation under reduced pressure to obtain an O-2-propynyl O-butyl N-dibutyl phosphoramidothioate product as a liquid residue having a refractive index n/D of 1.482 at 25° C. and a sulfur content of 9.4 percent as compared to a theoretical content of 10 percent.

*Example 4.—O-[1-(Trichloromethyl)-2-Propynyl] O-Isopropyl Phosphoramidothioate*

Sodium (1.38 grams; 0.06 mole) is dissolved in 100 milliliters of isopropanol to prepare a solution of the sodium salt of isopropanol. O-[1-(trichloromethyl)-2-propynyl] phosphoramidochloridothioate (16 grams; 0.56 mole; refractive index n/D of 1.5619 at 25° C.) is added portionwise with stirring to the above solution containing the alcoholate derivative. The addition is carried out over a period of 40 minutes at a temperature of from 4.5° to 7° C. with stirring being continued for three hours at 17° C. and the mixture set aside for 16 hours. The reaction mixture is then filtered and the solvent removed from the filtrate by fractional distillation under reduced pressure to obtain an O-[1-(trichloromethyl)-2-propynyl] O-isopropyl phosphoramidothioate product as a liquid residue having a refractive index n/D of 1.5355 at 25° C. and sulfur and phosphorus contents of 10.6 percent and 9.9 percent, respectively, as compared to theoretical contents of 10.3 percent and 9.98 percent.

*Example 5.—O-[1-(Trichloromethyl)-2-Propynyl] O-Ethyl N-Dibutyl Phosphoramidothioate*

Sodium (1.15 grams; 0.05 mole) is dissolved in 100 milliliters of ethanol to prepare a solution of sodium ethylate and 19 grams (0.476 mole) of O-[1-(trichloromethyl)-2-propynyl] N-dibutyl phosphoramidochloridothioate dispersed in 50 cc. of ethanol added portionwise thereto with stirring. The addition is carried out over a period of one half hour at a temperature of from 2° to 5° C. with stirring being continued thereafter for an additional 2 hours at 17° C. and the mixture set aside for 16 hours. The reaction mixture is then filtered and the filtrate fractionally distilled under reduced pressure to separate low boiling constituents and obtain an O-[1-(trichloromethyl)-2-propynyl] O-ethyl N-dibutyl phosphoramidothioate product as a liquid residue having a refractive index n/D of 1.53 at 25° C. and a chlorine content of 26.5 percent as compared to a theoretical content of 26.1 percent.

In a similar manner, other products of the present invention are prepared as follows:

O-[1-(trichloromethyl)-2-propynyl] O-methyl N-methyl phosphoramidate (molecular weight of 279; phosphorus content of 11 percent) by reacting together O-[1-(trichloromethyl)-2-propynyl] N-methyl phosphoramidochloridate and potassium methylate.

O-[1-(chloromethyl)-2-propynyl] O-methyl N-dimethyl phosphoramidate (molecular weight of 227; chlorine content of 15.5 percent) by reacting together O-[1-(chloromethyl)-2-propynyl] N-dimethyl phosphoramidochloridate and potassium methylate.

O-[1-(dichloromethyl)-2-propynyl] O-amyl N-methyl phosphoramidate (molecular weight of 300; chlorine content of 24 percent) by reacting together O-[1-(dichloromethyl)-2-propynyl] O-amyl phosphorochloridate and methyl amine.

O-[1-(dichloromethyl)-2-propynyl] O-methyl N-amyl phosphoramidothioate (molecular weight of 319; chlorine content of 23 percent) by reacting together O-[1-(dichloromethyl)-2-propynyl] O-methyl phosphorochloridothioate and amyl amine.

O-(1-methyl-2-propynyl) O-methyl phosphoramidate (molecular weight of 160; phosphorus content of 19 percent) by reacting together O-methyl phosphoramidate and the sodium salt of 1-methyl-2-propynol.

O-propynyl O-amyl N-amyl phosphoramidate (molecular weight of 275; phosphorus content of 11 percent) by reacting together O-propynyl O-amyl phosphorochloridate and amyl amine.

O-(1-methyl-2-propynyl) O-methyl N-methyl phosphoramidothioate (molecular weight of 204; sulfur content of 15 percent) by reacting together O-(1-methyl-2-propynyl) N-methyl phosphoramidochloridothioate and potassium methylate.

The compounds of the present invention are useful as parasiticides and herbicides for the control of a number of pests. For such uses, the products are dispersed on a finely divided solid such as chalk or talc or a finely divided solid surface active dispersing agent and the resulting products employed as dusts. Such mixtures may be dispersed in water with or without the addition of surface active dispersing agents and the resulting aqueous suspensions employed as sprays. In other procedures, the products are employed as active constituents in solvent solutions, oil-in-water or water-in-oil emulsions or aqueous dispersions. In representative operations, aqueous compositions containing 500 parts per million by weight of O-[1-(trichloromethyl)-2-propynyl] O-methyl N-methyl phosphoramidothioate give substantially complete controls of mites, roaches, bean aphids and Mexican bean beetles.

The O-alkynyl phosphoramidates and phosphoramidothioates employed as starting materials in accordance with the teachings of the present invention are prepared in accordance with known procedures wherein an O-alkynyl phosphorodichloridate or phosphorodichloridothioate is reacted with ammonia or a lower alkyl amine. The reaction conveniently is carried out in a reaction medium such as benzene or carbon tetrachloride and takes place readily at temperatures of from −10° to 30° C. with the production of the desired product and chloride of reaction. This chloride appears in the reaction mixture as the hydrochloride of the ammonia or amine reagent. Good results are obtained when employing one molecular proportion of the phosphorodichloridate or phosphorodichloridothioate with about two molecular proportins of ammonia or amine. Upon completion of the reaction, the desired starting material is separated by conventional procedures. The O-alkynyl phosphorodichloridates and phosphorodichloridothioates employed in accordance with these teachings such as O-[1-(trichloromethyl)-2-propynyl] phosphorodichloridothiate (boiling at 58°–63° at 0.08 millimeter pressure) and O-(1-methyl-2-propynyl) phosphorodichloridothioate (boiling at 36°–40° at 0.5 millimeter pressure) are prepared in known procedures wherein phosphorus oxychloride or phosphorus thiochloride is reacted with a suitable alkanol in the presence of a tertiary amine such as triethylamine as hydrogen chloride acceptor. The reaction conveniently is carried out in a reaction medium such as benzene and takes place readily at temperatures of from −15° to 30° C. Good results are obtained when employing substantially equimolecular proportions of the reactants and hydrogen halide acceptor. Upon completion of the reaction, the desired product is separated by fractional distillation under reduced pressure.

I claim:

1. A compound corresponding to the formula

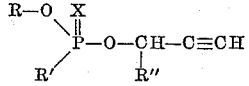

wherein R represents lower alkyl, R' represents a member of the group consisting of amido, mono lower alkyl amido and di-lower alkyl amido, R″ represents chloromethyl and X represents a member of the group consisting of oxygen and sulfur.

2. O-[1-(trichloromethyl)-2-propynyl] O-methyl N-methyl phosphoramidothioate.

3. O-[1-(trichloromethyl)-2-propynyl] O-isopropyl phosphoramidothioate.

4. O-[1-(trichloromethyl)-2-propynyl] O-ethyl N-dibutyl phosphoramidothioate.

5. O-[1-(trichloromethyl)-2-propynyl] O-methyl N-methyl phosphoramidate.

References Cited in the file of this patent
UNITED STATES PATENTS 2,894,019  Maeder _____ July 7, 1959

FOREIGN PATENTS 592,764  Canada _____ Feb. 16, 1960
1,085,524  Germany _____ July 21, 1960